United States Patent [19]
Yamada et al.

[11] Patent Number: 5,996,186
[45] Date of Patent: Dec. 7, 1999

[54] HOSE CLAMP

[75] Inventors: Satoshi Yamada; Masahiro Aihara, both of Yokohama, Japan

[73] Assignee: Piolax, Inc., Kanagawa-ken, Japan

[21] Appl. No.: 09/173,119

[22] Filed: Oct. 15, 1998

[30] Foreign Application Priority Data

Oct. 17, 1997 [JP] Japan .................................. 9-299604

[51] Int. Cl.⁶ .................................................. B65D 63/02
[52] U.S. Cl. ...................... 24/20 R; 285/253; 24/20 EE; 24/23 EE
[58] Field of Search ............................... 24/20 R, 20 EE, 24/20 S, 23 R, 23 EE, 278, 285; 285/252, 253, 242, 915

[56] References Cited

U.S. PATENT DOCUMENTS

| | | | |
|---|---|---|---|
| 4,858,279 | 8/1989 | Kato et al. ............................... | 24/20 R |
| 4,882,814 | 11/1989 | Takahashi ............................... | 24/20 R |
| 4,951,363 | 8/1990 | Takahashi et al. . | |
| 5,615,457 | 4/1997 | Steinkönig ............................... | 24/20 R |
| 5,620,209 | 4/1997 | Sauer ...................................... | 285/253 |
| 5,664,295 | 9/1997 | Kume et al. ............................. | 24/20 R |

FOREIGN PATENT DOCUMENTS

| | | |
|---|---|---|
| 52-14511 | 4/1977 | Japan . |
| 287194 | 7/1990 | Japan . |
| 9299604 | 10/1997 | Japan . |
| 1089577 | 4/1998 | Japan . |
| 2298255 | 8/1996 | United Kingdom . |

OTHER PUBLICATIONS

Search Report dated Jan. 8, 1999 from Application No. GB 98226640.0.

*Primary Examiner*—James R. Brittain
*Assistant Examiner*—Robert J. Sandy
*Attorney, Agent, or Firm*—Howard & Howard

[57] ABSTRACT

A clamp member comprises a shaped belt of spring sheet curled in a ring form with a pair of end leaves crossing each other in a circumferential direction of the ring form. One end leaf is bent in a radial direction of the ring form to provide a grip formed with a tip part configured with a top edge extending substantially in an axial direction of the ring form. The other leaf is bent in another radial direction of the ring form to provide another grip formed with a tip part configured with a top edge extending substantially in the axial direction. The top edge of this latter grip has a raised portion raised toward the other grip. A holder holds the two tip parts close together to enlarge the ring form, and comprises a top wall, and a pair of side walls each formed with a stopper to abut on a top end face of an axially extending portion of a corresponding top edge. The raised portion of the grip facilitates removing the holder with the use of a tool.

12 Claims, 10 Drawing Sheets

HOSE CLAMP

BACKGROUND OF THE INVENTION

1. Field of the Invention

The present invention relates to a hose clamp for clamping a hose, such as a rubber hose, to fix it to an end of a connection pipe.

2. Description of Relevant Art

Conventional hose clamps are disclosed for example in Japanese Utility Model Publication No. 52-14511 and Japanese Utility Mode Application Laid-Open Publication No. 2-87194.

The conventional hose clamps each comprise a clamp member as a principal body of a ring-like configuration and a holder as an accessory of a U-channel form. The clamp member comprises a shaped spring sheet normally curled in a ring with crossing end leaves, which are radially outwardly bent to provide a pair of grips to be forced close to each other to enlarge the ring before application to a hose. The grips are forced closer together for a smooth insertion of their tips into a medium depth of the holder, and released so that the grip tips resiliently abut on both side walls of the holder, whereby they are held together, keeping the ring enlarged for a convenient application, with the grip tips spaced from a top wall of the holder to provide a spacing therebetween, with a resultant gap left between the tips.

For application to a hose, the enlarged ring is first put on the hose. After an end of the hose is fitted on a connection pipe, the ring is relocated in position on the hose end. Then, with a tool such as a pair of pliers inserted in the spacing between the holder and the grips, the holder is pinched to be pulled up for removal, allowing for the ring to contract, clamping the hose end from outside, permitting a secure fixing to the connection pipe.

For the holder removal, a screw driver or the like sometimes substitutes for the pliers or the like, as circumstances require. Such a tool has a size-reduced end, which is inserted in the spacing between the holder and the grips, and operated like a lever with force to raise the holder to be removed. It is often the case, however, that the tool end tends to slip into the gap between the grip tips, disabling an effective use of the principle of a lever.

SUMMARY OF THE INVENTION

The present invention has been achieved with such points in view.

It therefore is an object of the present invention to provide a hose clamp, permitting an increased diversity of tool applications for removing the holder.

To achieve the object, an aspect of the invention provides a hose clamp comprising a clamp member comprised of a shaped spring sheet curled in a ring form with a pair of end leaves crossing each other in a circumferential direction of the ring form. One end of a first leaf is bent in a radial direction of the ring form to provide a first grip formed with a first tip part configured with a first top edge extending substantially in an axial direction of the ring form. The other leaf is bent in another radial direction of the ring form to provide a second grip formed with a second tip part configured with a second top edge extending substantially in the axial direction. The second top edge has a raised portion raised toward the first tip part. A holder is attached to hold the first and second tip parts together to have a ring form enlarged. The holder preferably is comprised of a top wall and a pair of side walls formed with stoppers to abut on the first and second top edges.

According to this invention, a clamp member of a hose clamp has first and second top edges adapted to receive stoppers for securing a spacing between a top wall of a holder and the top edges of the leaves, a raised portion of the second top edge provides a support base for a tool to remove the holder. The raised portion extends and covers a gap between the leaves to prevent a tool from slipping into a gap between the first and second tip parts, permitting an increased diversity of tool applications. The raised portion has a rigidity, as a continued portion of the second tip part is likewise raised.

The raised portion may preferably comprise both end parts of the second top edge, a pair of round raised parts between both ends of the second top edge, or a central part of the second top edge raised in a triangular form, to provide a more effective support for a type of tool to be operated thereon for removing the holder. The second top edge preferably is formed with a dent near the raised portion, for an effective prevention of an extended deformation in a region of an end face of the second top edge to be possibly flat for abutment with a stopper in the holder. The spring sheet is shaped so that the first grip may have a smaller axial width than the second grip.

Further, to achieve the object described, another aspect of the invention provides a hose clamp comprising a clamp member as a main body comprised of a clamp ring and a pair of grips as segments thereof crossing each other. A holder is a separate body to be fitted on the pair of grips. As the holder fits on the pair of grips, the pair of grips are brought close to each other, having a space defined between an inside of the holder and respective upper end faces of the pair of grips, to hold the clamp ring in a diameter-enlarged state. The holder has inwardly projecting stopper portions provided on both side walls thereof, the stopper portions are each adapted to abut on the upper end face of a corresponding grip. One grip is wide in width dimension, while the other grip is more narrow in width dimension. Further, at least one grip has at both side edges of an upper tip thereof a pair of raised shoulder parts bent toward the other grip.

According to this aspect of the invention, stopper portions of a holder are brought into abutment on a pair of grips, thereby restricting a position for the holder to fit on the pair of grips, having a space of a desirable size defined between an inside of the holder and upper end faces of the pair of grips. One grip has an upper tip and a pair of raised shoulder parts bent toward the other grip, so that the grips have a reduced or blocked gap therebetween. Therefore, in use of a tool such as a screw driver to force the holder off with an end of the tool inserted in the space described, the tool end is prevented from slipping into the gap between the grips, and can be handled like a lever.

According to another aspect of the invention, the pair of raised shoulder parts are bent from both side edges of the upper tip of the other grip in a triangle form having a greater rise at a closer location to an end of the upper tip.

According to this aspect of the invention, that grip which is wider in width dimension can have a rectangular upper tip simply bent at top corners to provide a pair of raised shoulder parts, permitting an increased yield of spring sheet. Moreover, when the grip is fitted in a holder together with a grip narrow in width dimension, the pair of raised shoulder parts have their greatest rise at their tip ends to be located in vicinities of both side edges of an upper tip of this grip, with an ensured reduction or blocking of a gap between the grips.

Still further, to achieve the object described, another aspect of the invention provides a hose clamp comprising a clamp member as a main body comprised of a clamp ring and a pair of grips as segments thereof crossing each other. A holder is a separate body to be fitted on the pair of grips. The holder fits on the pair of grips, as the pair of grips are brought close to each other, having a space defined between an inside of the holder and respective upper end faces of the pair of grips, to hold the clamp ring in a diameter-enlarged state thereof. The holder has inwardly projecting stopper means provided on both side walls thereof. The stopper means are each adapted to abut on the upper end face of a corresponding grip, one grip is wide in width dimension, the other grip is narrow in width dimension, and the other grip has at an upper tip thereof a radially extending raised shoulder part raised toward the one grip.

Yet further, to achieve the object described, another aspect of the invention provides a hose clamp comprising a clamp member as a main body comprised of a clamp ring and a pair of grips as segments thereof crossing each other. The holder is a separate body to be fitted on the pair of grips. The holder fits on the pair of grips, as the pair of grips are brought close to each other, having a space defined between an inside of the holder and respective upper end faces of the pair of grips, to hold the clamp ring in a diameter-enlarged state. The holder has inwardly projecting stopper means provided on both side walls. The stopper means are each adapted to abut on the upper end face of a corresponding grip. One grip is wide in width dimension. The other grip is narrow in width dimension. One grip has a radially extending raised shoulder part at an upper tip raised toward the other grip.

Stopper members of a holder are brought into abutment on a pair of grips, thereby restricting a position for the holder to fit on the pair of grips. A space of a desirable size preferably is defined between an inside of the holder and upper end faces of the pair of grips. A wider one or a narrower one of the pair of grips has a radially extending raised shoulder part at an upper tip raised toward the remaining one of the grips, so that the grips have a reduced or blocked gap therebetween. Therefore, in use of a tool such as a screw driver to force the holder off with an end of the tool inserted in the space described, the tool end is prevented from slipping into the gap between the grips, and can be handled like a lever. Moreover, an edge-to-edge frictional contact at a back of the upper tip permits a moderate removal of the holder with a moderate reaction to the tool.

BRIEF DESCRIPTION OF THE DRAWINGS

The above and further objects and novel features of the present invention will more fully appear form the following detailed description when the same is read in conjunction with the accompanying drawings, in which.

DETAILED DESCRIPTION OF THE PREFERRED EMBODIMENTS

There will be detailed below the preferred embodiments of the present invention with reference to the accompanying drawings. Like members are designated by like reference characters.

Figure 1:
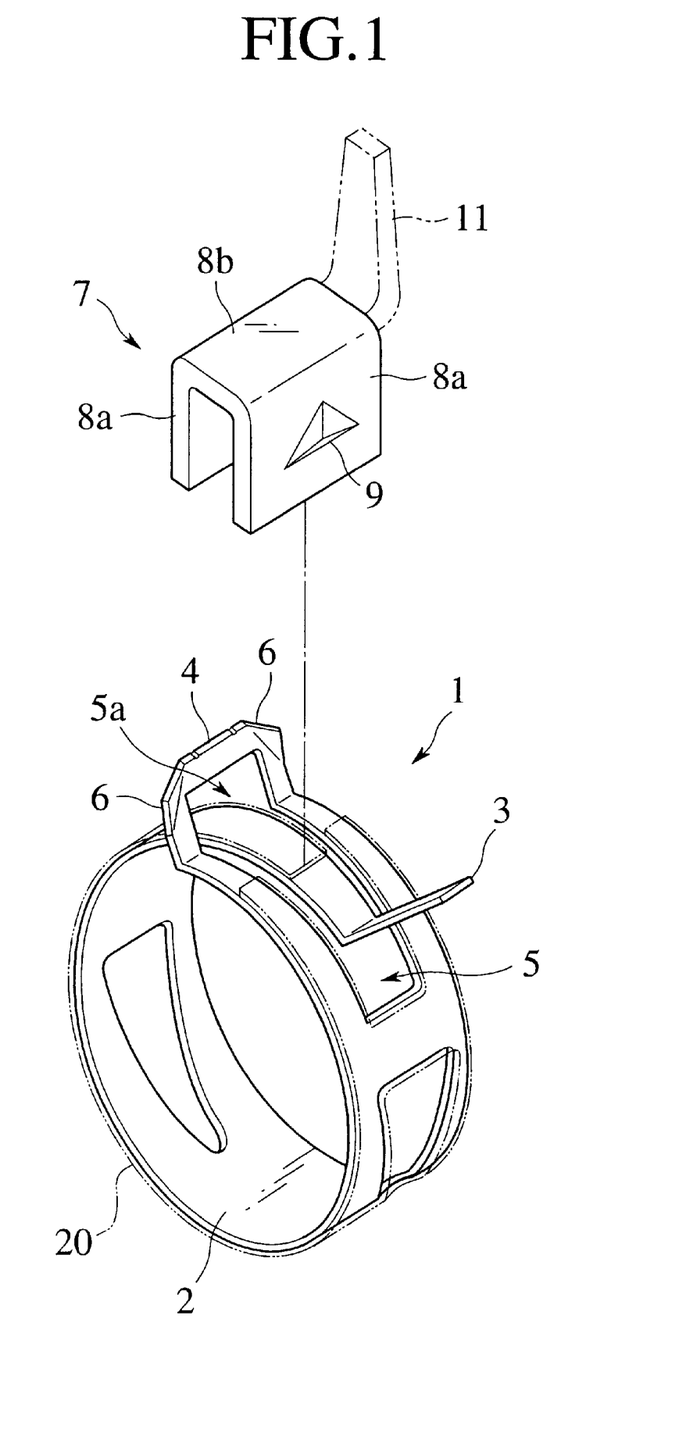
FIG. 1 is a perspective exploded view of a hose clamp according to an embodiment of the invention.

FIG. 1 shows a hose clamp according to a first embodiment of the invention. The hose clamp comprises a clamp member 1 as a main body, and a holder 7 as an accessory body. The clamp member 1 is comprised of a shaped spring sheet belt curled in a ring form 2 (hereafter sometimes called "clamp ring") provided with a pair of left and right free end leaves crossing each other in a circumferential direction of the clamp ring 2.

One end leaf at the right in the figure is gradually reduced in width and bent at substantially a half or medium length thereof in a radial direction of the clamp ring 2 to provide a narrow and generally planar plate grip 3, which is formed with a substantially square tip part configured with a rectangular edge having a top edge extending substantially in an axial direction of the clamp ring 2 and radially extending front and rear side edges.

The other end leaf at the left in the figure is substantially U-shaped and includes a flat front frame, a flat rear frame and a flat top frame, and has a guide groove 5 defined between the front and rear frames for accommodating the right leaf to be freely movable through the guide groove 5 in the circumferential direction. The left leaf is bent at substantially a half or medium length thereof in another radial direction of the clamp ring 2 to provide a wide gate-form and substantially planar grip 4 including radially extending front and rear legs as corresponding parts of the front and rear frames and a top beam as the top frame extending in the axial direction, and has a square gate way opening 5a defined by the front and rear legs and the top beam. The grip 4 preferably has an upper tip part of a low-gate form composed of substantially upper halves or thirds of the front and rear legs and the upper beam, and the upper tip part is configured with a top edge as an upper edge part of the top beam extending substantially in the axial direction and substantially radially extending front and rear side edges as corresponding outer edges of the front and rear legs.

The holder 7 has an inverted-U form or C-channel shaped and is sized so as to fit on the left and right grips 3, 4, as the grips are forced in close to each other to enlarge the clamp ring 2 and released to abut on insides of the holder 7, keeping the ring form in a diameter-enlarged state. The clamp ring 2 may have a solid or punched outer clamp ring 20 tight fitted thereon to provide an increased and controlled spring rate.

Figure 2A:
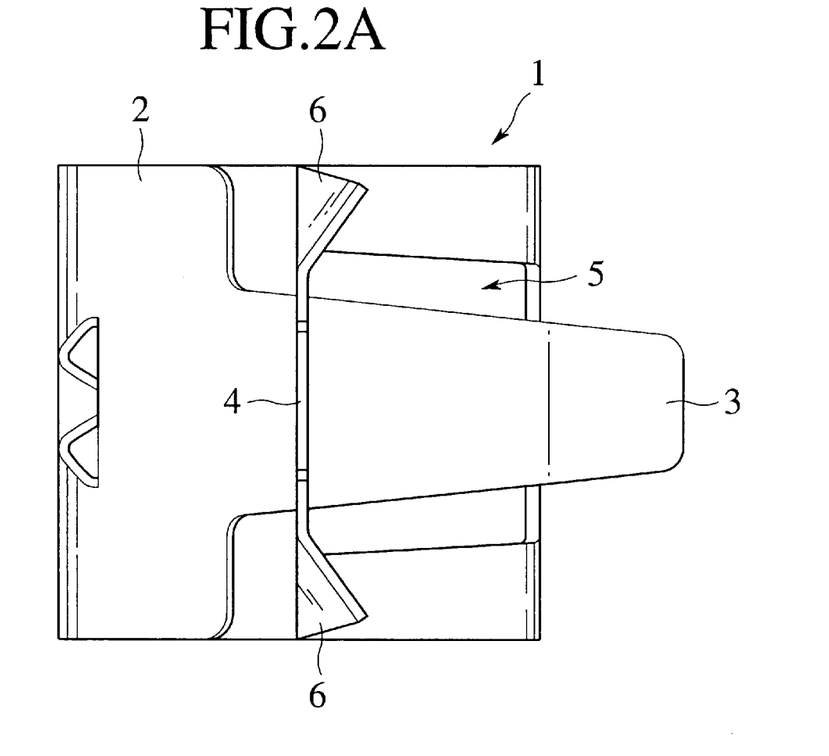
FIG. 2A is a plan view of a clamp member of the hose clamp of FIG. 1.

Referring to FIGS. 1 and 2A, the top edge of the tip part of the left grip 4 has one or more raised portions raised toward the tip part of the right grip 3, and a dent located near each raised portion. The raised portion extends away from the plane of the grip. In this embodiment, the raised portions comprise both end parts of the left top edge bent toward the right tip part. The left tip part preferably has a pair of oblique triangular integral portions 6. At both end parts of the left top edge and bent toward the right tip part. In other words, the left grip 4 has at both side edges of a wide upper tip thereof a pair of raised shoulder parts 6 bent toward the right grip, which shoulder parts 6 are bent from both side edges of the upper tip of the left grip 4 in an oblique triangle form having a greater rise at a closer location to an end of the upper tip.

Figure 2B:
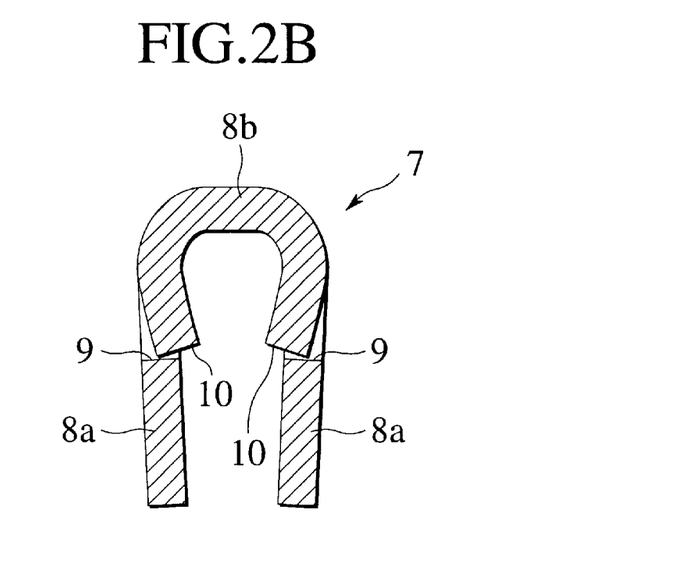
FIG. 2B is a sectional view of a holder of the hose clamp of FIG. 1.

Referring to FIGS. 1 and 2B, the holder 7 is formed with a top wall 8b and left and right side walls 8a. Each side wall 8a preferably has at an axially and radially central region thereof a linearly cut and inwardly projected triangular part 9, of which a lower end face 10 is adapted as a stopper means to abut on an upper end face of the tip part of a corresponding one of the left and right grips 3, 4.

Figure 3A:
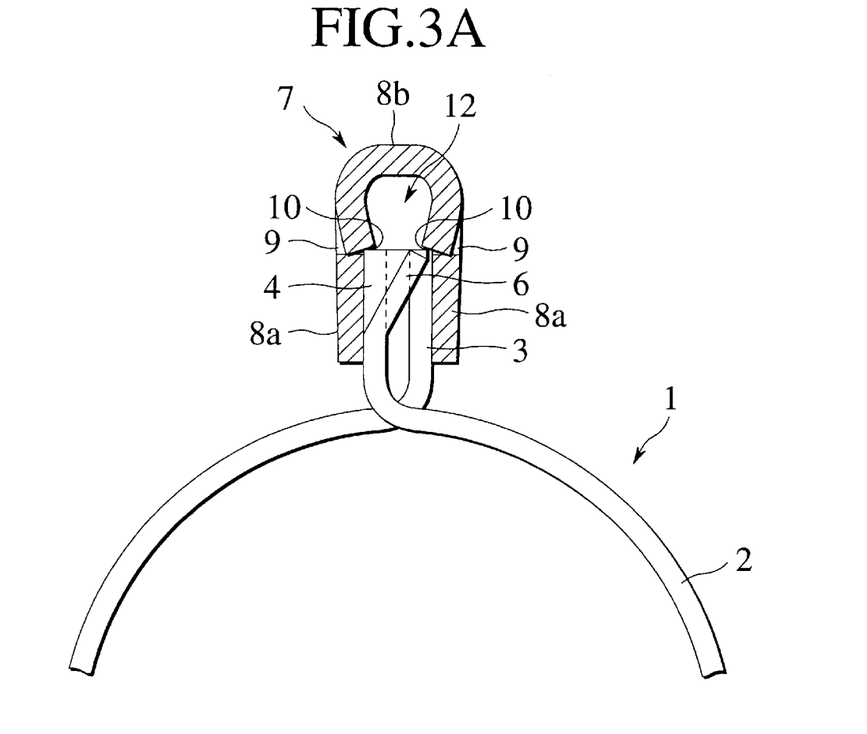
FIG. 3A is a fragmentary front view, partly in section, of the hose clamp of FIG. 1, with the holder fitted on a pair of grips.
Figure 3B:
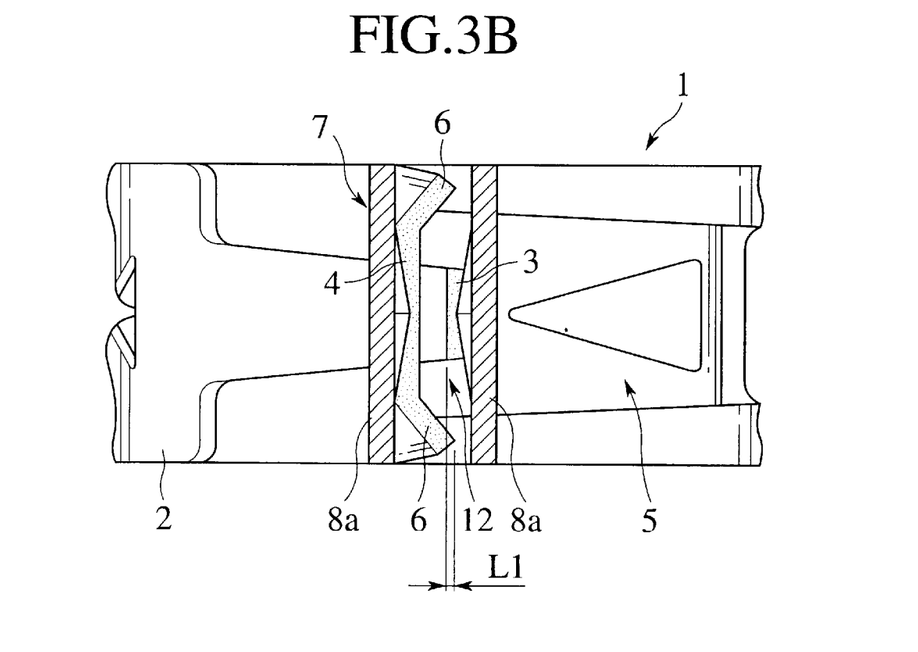
FIG. 3B is a fragmentary plan view, partly in section, of the hose clamp of FIG. 1, as the holder is removed.

The pair of grips 3, 4 are forced in close to each other, and the holder 7 of the inverted-U form is fitted on the grips 3, 4, to hold the clamp ring 2 in the diameter-enlarged state. As shown in FIGS. 3A and 3B, when the holder 7 is fitted on the grips 3, 4, the lower end faces 10 of the respective linearly cut and inwardly projecting parts 9 of the holder 7 are brought into abutment on the upper end faces of the grips 3, 4, thereby restricting a position for the holder 7 to fit on the grips 3, 4, having a space 12 of a desirable size defined between an inside of the top wall 8b of the holder 7 and the upper end faces of the grips 3, 4.

In the fit-on condition of the holder 7, the cut lower end faces 10 of the inwardly projected parts 9 of the holder 7 contact either on an entire axial length of the upper end face of the right grip 3 and the other on a central axial length of the upper end face between the raised shoulder parts 6 of the left grip 4. This arrangement ensures positional restriction and a stable fit-on hold. The pair of raised shoulder parts 6 formed at both side edges of the upper tip of the left grip 4 each provide a sufficient allowance L1 for an overlap with the upper tip of the right grip 3, thus blocking a gap between the grips 3, 4 in an axial view.

For application to a rubber hose (not shown), the hose is first let through the clamp ring 2, as the clamp ring 2 is held in the diameter-enlarged state by the holder 7 of the inverted-U form. Then, an end of the rubber hose is fitted on an end of a connection pipe (not shown). As the clamp ring 2 is placed in position on the hose end, the holder 7 is removed from the grips 3, 4. At this moment, the clamp ring 2 automatically contracts to a reduced diameter, so that the rubber hose is fixed tight to the connection pipe.

Figure 4:
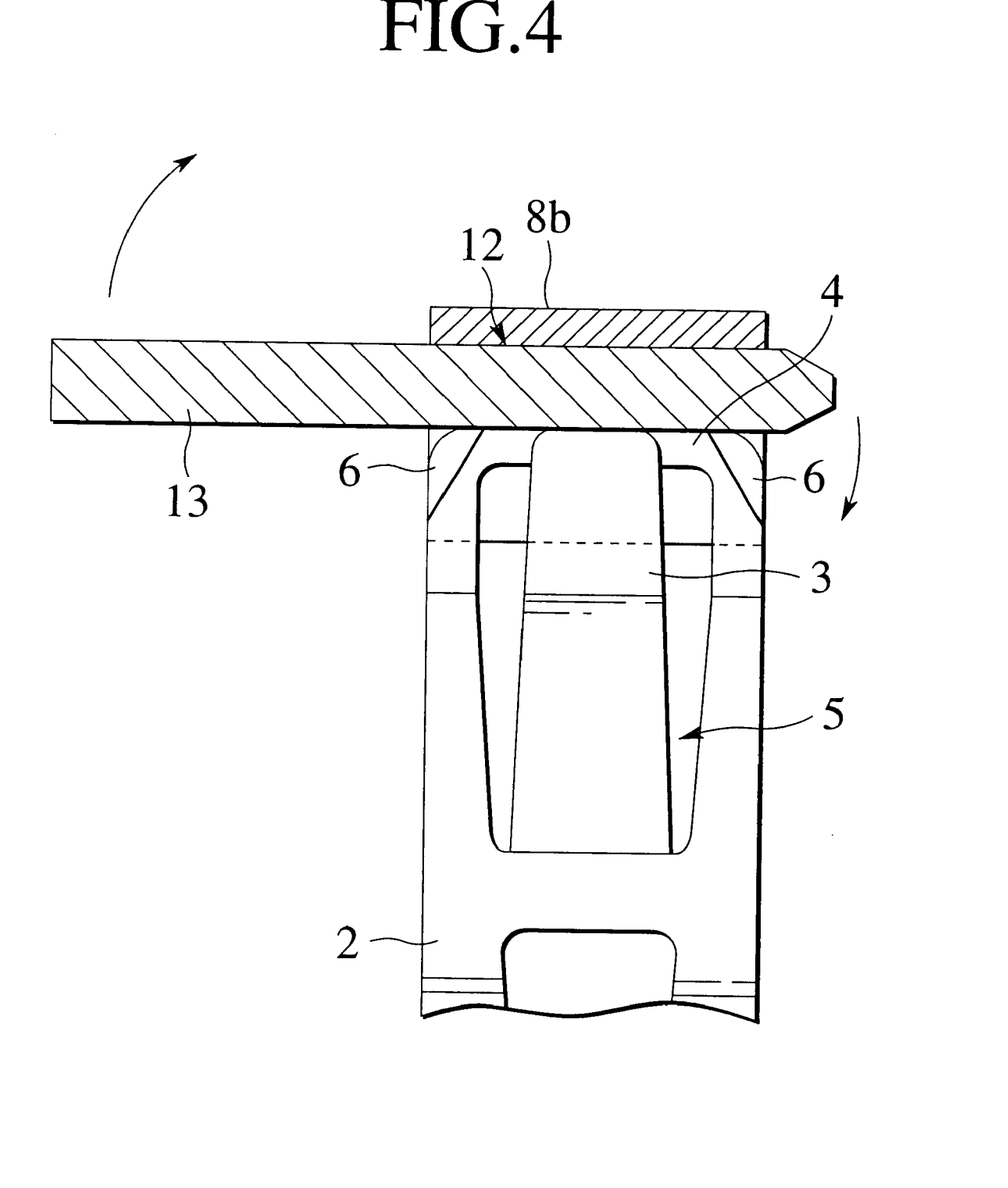
FIG. 4 is a fragmentary sectional view of the hose clamp of FIG. 1, with an inserted toll end for a holder removal operation.

As shown in FIG. 4, a tool end 13 such as a screw driver is shown being used for the removal of the holder 7 form the grips 3, 4. The tool end 13 has a tapered configuration or the like, which is utilized for a lateral insertion of the tool end 13 into the space 12. The tool end 13 can be inserted smoothly, as the raised shoulder parts 6 prevent the tool from slipping into a gap between the grips 3, 4. The tool end 13 simply can be operated slightly upwards like a lever to remove the holder 7 from the grips 3, 4 without undue forces.

In the first embodiment, the pair of raised shoulder parts 6 are formed at both side edges of an upper tip of a wide grip 4 defining a radial opening 5a of a pair of a guide groove 5, and allowing an increased yield of material. The shoulder parts 6 also provide for the wide grip 4 to have an increased rigidity and to be free of deformation when forced close to the narrow grip 3, even when a pair of pliers are used for pinching the grips 3, 4 close to each other. The upper edges of the grips 3, 4 may simply be pinched to be forced together so that the clamp ring 2 is prevented from dropping out of the pliers.

Figure 5:
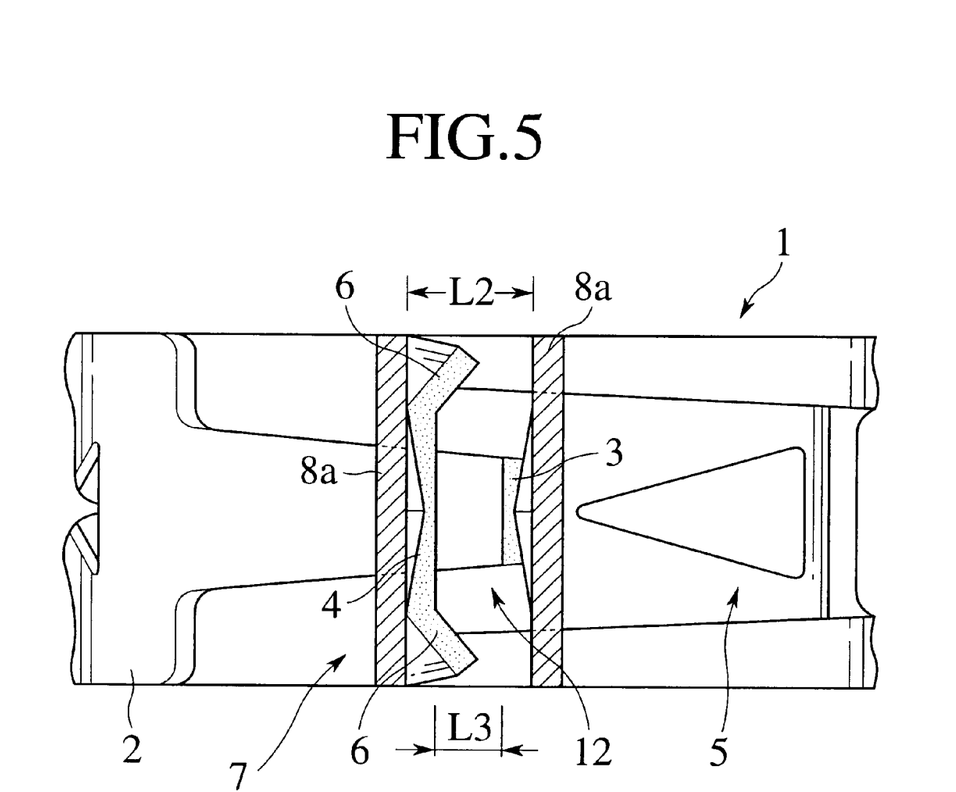
FIG. 5 is a fragmentary plan view, partly in section, of the hose clamp of FIG. 1, with a reduced space between the pair of grips.

In the first embodiment, the pair of raised shoulder parts 6 each have an overlap L1 with the narrow grip 3 to block a gap between the narrow grip 3 and the wide grip 4. As shown in FIG. 5, a holder 7 may have a larger width L2 between both side walls 8a, so that the pair of grips 3, 4 may have a gap L3 left therebetween when fitted in the holder 7. However, as the pair of raised shoulders 6 are significantly raised toward the narrow grip 3 at both axial sides, the gap L3 between the grips 3, 4 should have an effectively reduced dimension, allowing for a tool end 13 such as of a screw driver to be operated with ease for removal of the holder 7 from the grips 3, 4.

A pair of pliers may well be employed for pinching a side wall 8a of the holder 7 to be removed. To this point, as shown in FIG. 1, the holder 7 preferably includes a projecting piece 11 to be pinched by a pair of pliers for pulling off the holder 7.

Figure 6:
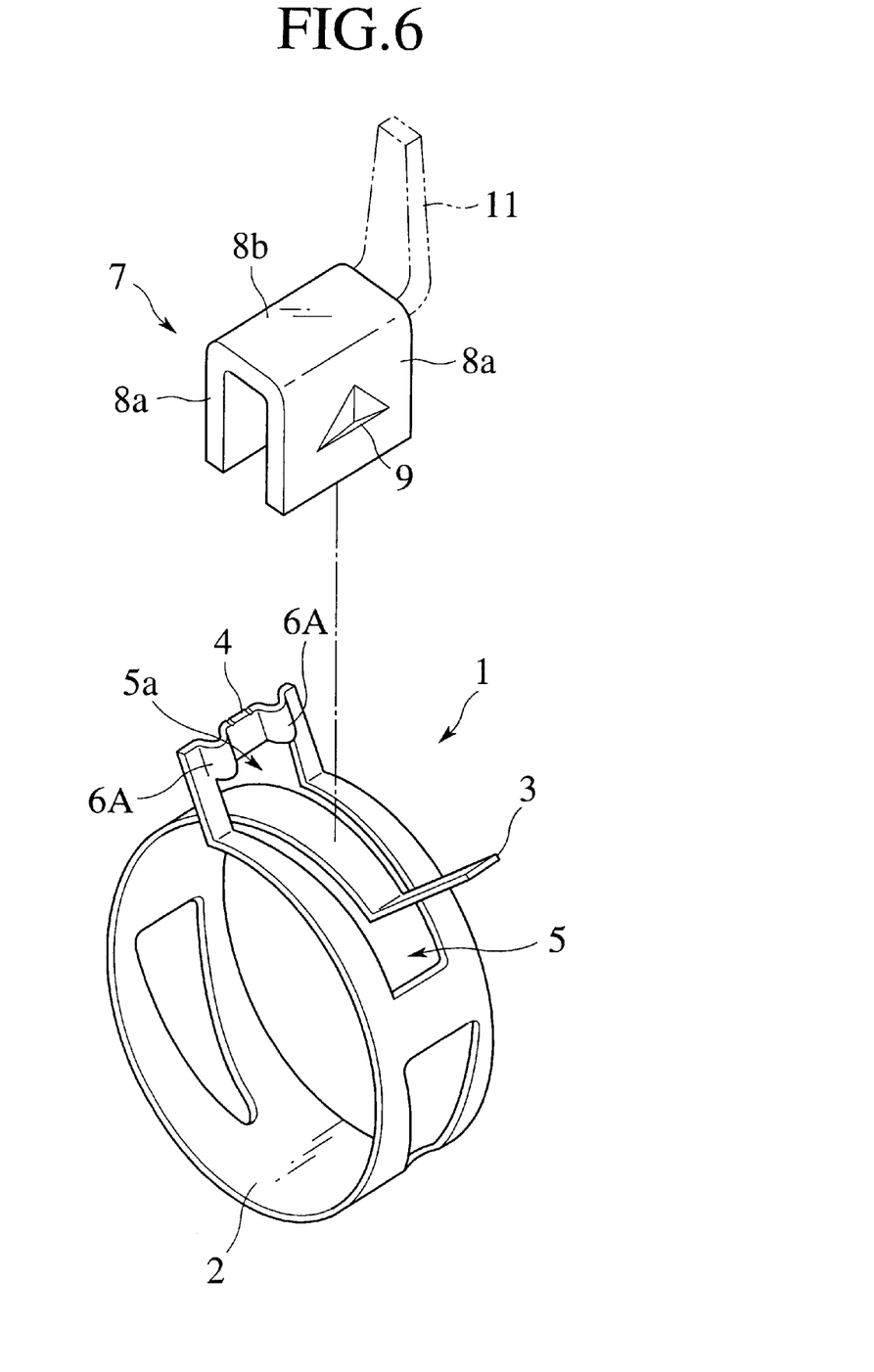
FIG. 6 is a perspective exploded view of a hose clamp according to another embodiment of the invention.

FIG. 6 shows a hose clamp according to a second embodiment of the invention. This hose clamp employs, in place of the raised shoulder parts 6 bent in a triangular form at both side edges of the upper tip of the wise grip 4 in the first embodiment, a pair of raised shoulder parts 6A raised at locations between front and rear legs of a tip part of the wide grip 4. The raised shoulder parts 6A preferably are within a region of a top beam corresponding to the radial opening 5a of the guide groove 5. The raised shoulder parts 6A preferably have a round or angled form toward a tip part of the narrow grip 3 and extend along the height of the top beam. The raised shoulder parts 6A can be press-formed with ease, and contribute to an increased radial rigidity of the top beam, as well as to that of the tip part of the wide grip 4.

Figure 7A:
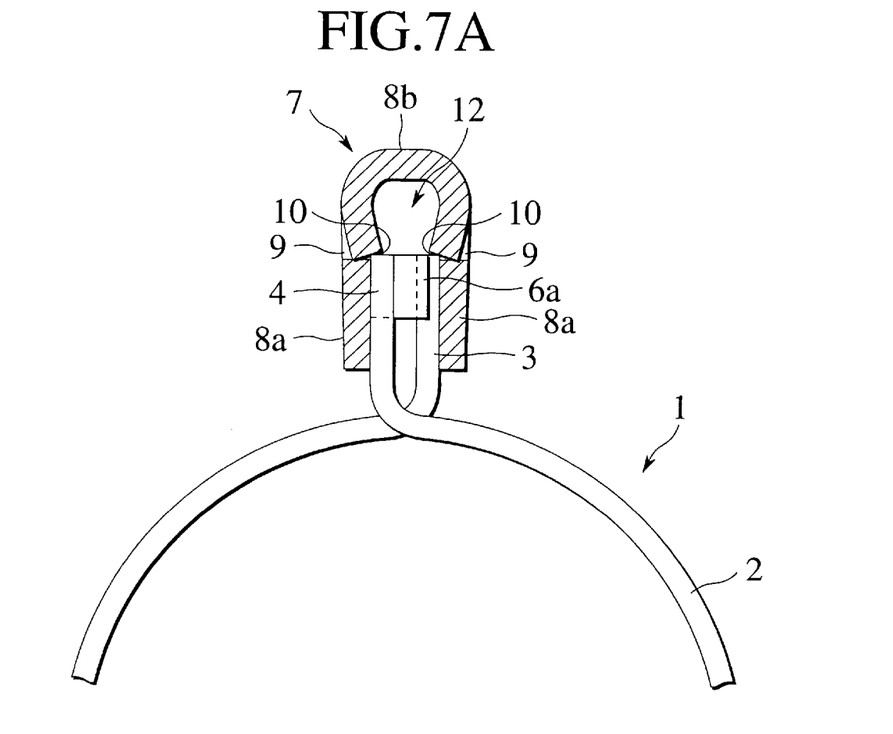
FIG. 7A is a fragmentary front view, partly in section, of the hose clamp of FIG. 6, with a holder fitted on a pair of grips.
Figure 7B:
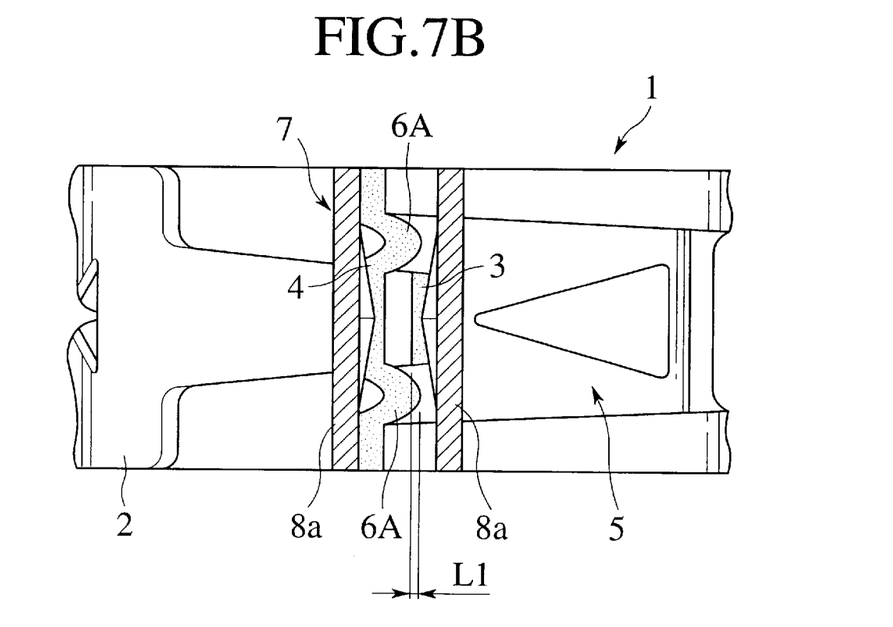
FIG. 7B is a fragmentary plan view, partly in section, of the hose clamp of FIG. 6, as the holder is removed.

As will be seen from FIGS. 7A and 7B, in the second embodiment also, under a fit-on condition of the holder 7, respective cut lower end faces 10 of inwardly projected parts 9 of the holder 7 contact an entire axial length of an upper end face of the narrow grip 3 an the central axial length of an upper end face between the raised shoulder parts 6A of the wide grip 4. This arrangement permits an ensured positional restriction and a stable fit-on hold. In addition the raised shoulder parts 6A formed on the top beam at a predetermined interval and with a sufficient rise provide an allowance L1 for an overlap with both sides of the upper tip of the narrow grip 3, thus blocking a gap between the grips 3, 4 in an axial view.

Like the first embodiment, after an end of a rubber hose is fitted on an end of a connection pipe and a clamp ring 2 is placed in position on the hose end, a tool end is inserted in the space 12 defined between an inside of the top wall 8b of the holder 7 and the respective upper end faces of the tip parts of the grips 3, 4. The tool end can be inserted smoothly, as the raised shoulder parts 6A block the tool from slipping into a gap between the grips 3, 4, and will simply be operated slightly upwards like a lever to remove the holder 7 from the grips 3, 4 without undue force. The raised shoulder parts 6A effectively provide a leverage surface that simplifies removing the holder 7.

Figure 8:
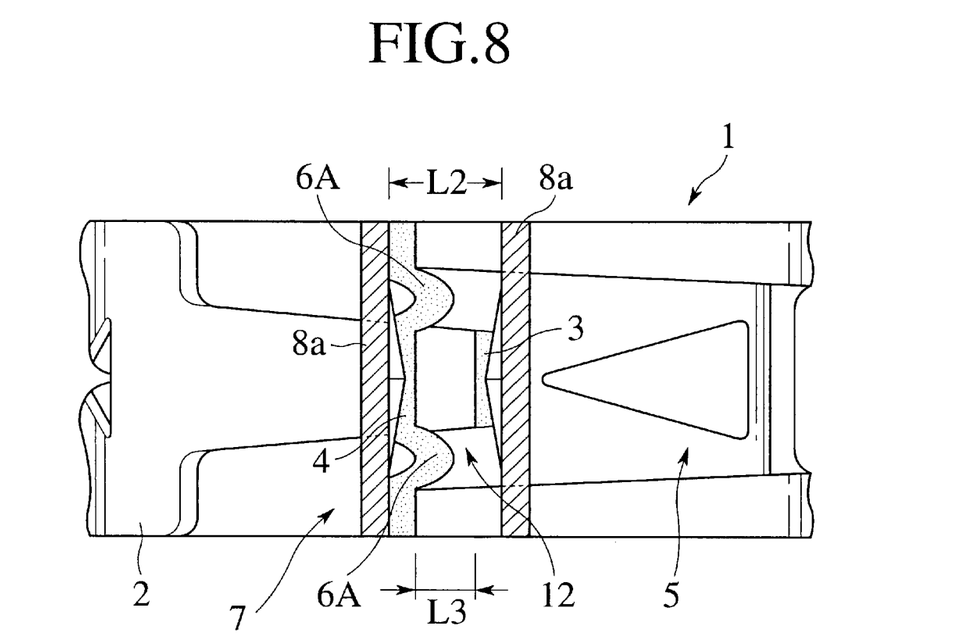
FIG. 8 is a fragmentary plan view, partly in section, of the hose clamp of FIG. 6, with a reduced space between the pair of grips.

As shown in FIG. 8, the holder 7 according to the second embodiment may have a larger width L2 between both side walls 8a, so that a pair of grips 3, 4 may have a gap L3 left therebetween when fitted in the holder 7. However, as the pair of raised shoulders 6A are significantly raised toward the narrow grip 3 at both axial sides, the gap L3 between the grips 3, 4 should have an effectively reduced dimension, allowing for a tool end (such as of a screw driver) to be operated with ease for a removal of the holder 7 from the grips 3, 4.

In the second embodiment, the pair of raised shoulder parts 6A preferably radially extend along the height of the top beam of the tip part of the wide grip 4, and are rigid enough to support a tool end to be operated like a lever to remove the holder 7, permitting a moderate holder removal.

Figure 9:
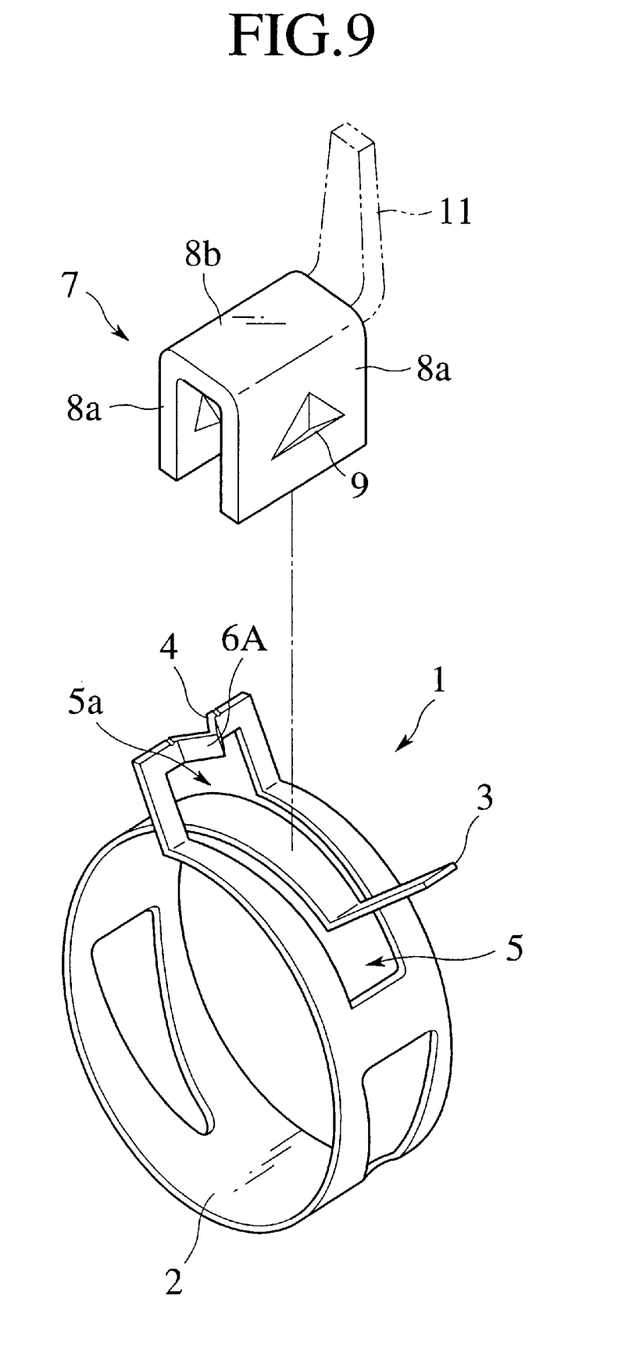
FIG. 9 is a perspective exploded view of a hose clamp according to another embodiment of the invention.
Figure 10:
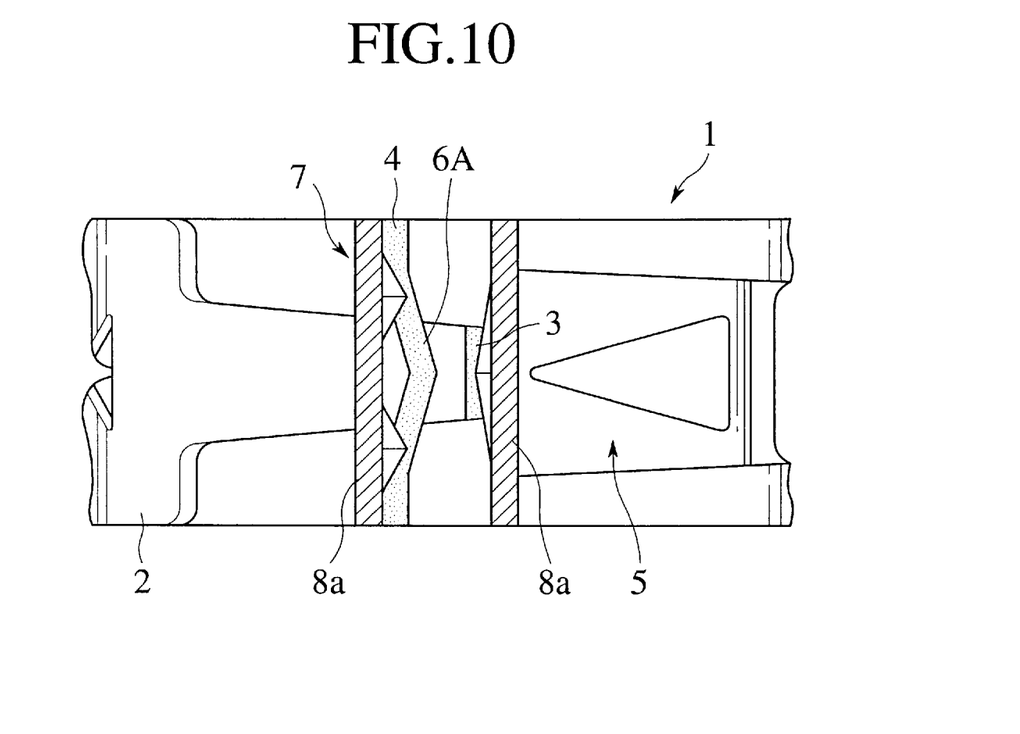
FIG. 10 is a fragmentary plan view, partly in section, of a hose clamp of FIG. 9, with a holder fitted on a pair of grips.

FIGS. 9 and 10 show a hose clamp according to a third embodiment of the invention. This hose clamp employs (in place of the pair of raised shoulder parts 6A formed at the top beam bridging the radial opening 5a of the guide groove 5 in the second embodiment) a single radially extending raised shoulder part 6A raised at a central region of a top beam of a tip part of a wide grip 4 in an angled (illustrated) or round (not specifically illustrated) form toward a tip part of the narrow grip. In place of a single linearly cut and inwardly projected part 9 in a left side wall 8a of the holder 7 in the second embodiment, a pair of linearly cut and inwardly projected parts 9 preferably are formed in axially front and rear half regions of a left side wall 8a of the holder 7, which has a single linearly cut and inwardly projected part 9 in a central region of a right side wall 8a thereof, so that respective lower end faces of the pair of projected parts 9 of the left side wall 8a abut on front and rear remaining axial regions of a top face of the top beam of the wide grip 4 (see FIG. 10). A lower end face of the single projected part 9 of the right side wall 8a preferably abuts on an entire region of a top face of a top edge of the tip part of the narrow grip 3.

In the third embodiment, under a fit-on condition of the holder 7, the lower end faces of the projected parts 9 of the holder 7 permits an ensured positional restriction and a stable fit-on hold, in addition to that the raised shoulder part 6A formed on the top beam of the wide grip 4 with sufficient rise reduces a gap between the grips 3, 4, permitting a smooth lateral insertion of a tool end (such as of a screw driver) to be operated with ease for removal of the holder 7 from the grips 3, 4. Moreover, the pair of cut lower end faces to abut on both front and rear regions of the top face of the wide grip 4 allow an enhanced stableness for the holder 7 to be fit on the grips 3, 4, as well as an associated stable support for the tool end to be operated thereon like a lever.

Figure 11:
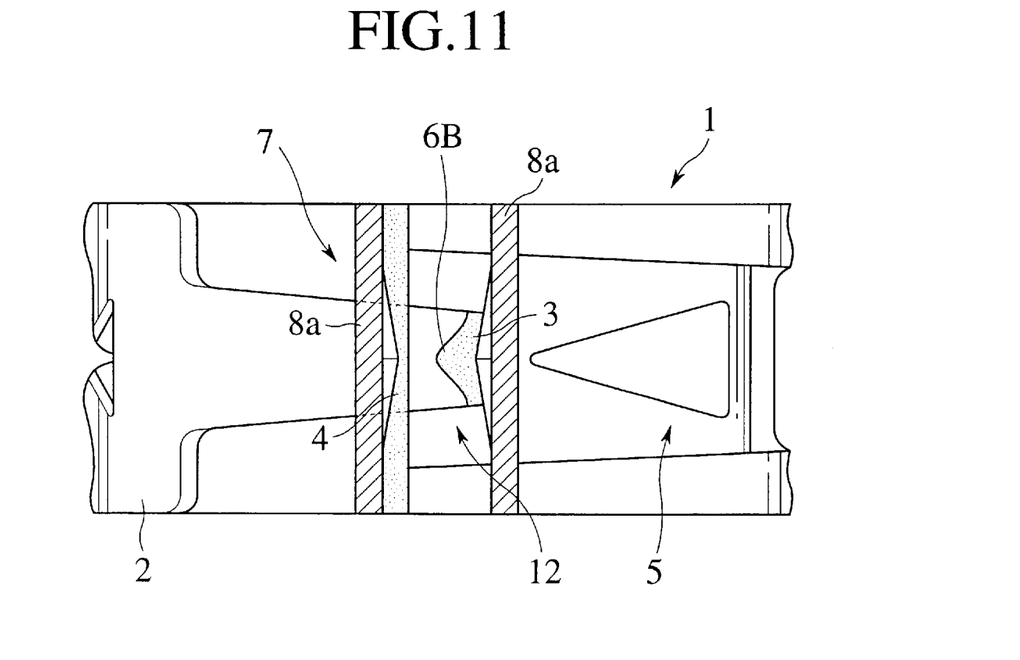
FIG. 11 is a fragmentary plan view, partly in section, of a hose clamp according to another embodiment of the invention, with a holder fitted on a pair of grips.

FIG. 11 shows a hose clamp according to a fourth embodiment of the invention. This hose clamp employs, in place of each raised shoulder part 6 or 6A formed at a tip part of a wide grip 4 in a respective antecedent embodiment, a raised shoulder part 6B bent or raised at a corresponding region of an edge of a tip part of the narrow grip 3 in a triangular form or an angled or round form toward a tip part of a wide grip 4.

In the fourth embodiment also, under a fit-on condition of a holder 7, lower end faces of linearly cut and inwardly projected parts 9 of side walls 8a of the holder 7 abut on one or more remaining axial regions of a top face of the tip part of the narrow grip 3 and an entire region of a top face of the tip part of the wide grip 4, permitting an ensured positional restriction and a stable fit-on hold, in addition to that the raised shoulder part 6B formed at the tip part of the narrow grip 3 with sufficient rise reduces a gap between the grips 3, 4, allowing a smooth lateral insertion of a tool end (such as a screw driver) to be operated with ease for removal of the holder 7 from the grips 3, 4. Embodiments where the raised shoulder part 6B radially extends, the grip 3 which inherently had a rigidity corresponding to a narrow width has an increased rigidity.

In these cases, the raised shoulder part 6B can be rigid enough to resist a load acting downwards and little deforms, permitting a sufficient support for a tool end to be operated thereon like a lever for a removal of the holder 7 from the grips 3, 4, in a moderate manner free of undue reaction.

While preferred embodiments of the present invention have been described using specific terms, such description is for illustrative purposes, and it is to be understood that changes and variations may be made without departing from the spirit or scope of the following claims.

What is claimed is:

1. A hose clamp comprising:
   a clamp member comprised of a shaped spring sheet curled in a generally ring form with two end leaves crossing each other in a circumferential direction of the ring form,
   one of said leaves being bent in a radial direction of the ring form to provide a first grip formed with a first tip part configured with a first top edge extending substantially in an axial direction of the ring form, and
   the other said leaf being bent in another radial direction of the ring form to provide a second grip formed with a second tip part configured with a second top edge extending substantially in the axial direction, the second top edge having a raised portion towards the first tip part; and
   a holder for selectively holding the first and second tip parts together to have the ring form enlarged, the holder being comprised of a top wall and a pair of side walls formed with stoppers to abut on the first and second top edges of said end leaves.

2. The hose clamp as claimed in claim 1, wherein the raised portion comprises both end parts of the second top edge bent toward the first tip part, and the second tip part has a pair of triangular portions thereof including the both end parts of the second top edge and bent toward the first grip.

3. The hose clamp as claimed in claim 1, wherein the raised portion comprises a pair of round raised parts between both ends of the second top edge, and the second tip part has a pair of axially partial portions thereof including the pair of round raised parts of the second top edge and raised toward the first tip part.

4. The hose clamp as claimed in claim 1, wherein the raised portion comprises a central part of the second top edge raised in a triangular form, and the second tip part has an axially central portion thereof including the central part of the second top edge and raised toward the first tip part.

5. The hose clamp as claimed in claim 1, wherein the second top edge is formed with a dent near the raised portion.

6. The hose clamp as claimed in claim 1, wherein the first grip has a smaller width in the axial direction that the second grip.

7. The hose clamp as claimed in claim 1, wherein the second grip is substantially planar and the raised portion extends away from the plane toward the first grip.

8. A hose clamp comprising:
   a clamp member as a main body comprised of
      a clamp ring and
      a pair of grips as segments thereof crossing each other; and a holder as a separate body to be fitted on the pair of grips, in which the holder fits on the pair of grips, as the pair of grips are brought close to each other, having a space defined between an inside of the holder and respective upper end faces of the pair of grips, to hold the clamp ring in a first diameter wherein:

the holder has two side walls with inwardly projecting stopper portions provided on the side walls;

the stopper portions are each adapted to abut on an upper end face of a corresponding grip;

one grip has a first width dimension that is smaller than the first width dimension; and the other grip has at both side edges of an upper tip thereof a pair of raised shoulder parts bent toward the one grip.

9. The hose clamp as claimed in claim 8, wherein the pair of raised shoulder parts are bent from both side edges of the upper tip of the other grip in a generally triangle form having a greater rise at a closer location to an end of the upper tip.

10. A hose clamp comprising:

a clamp member as a main body comprised of
a clamp ring and
a pair of grips as segments thereof crossing each other; and a holder as a separate body to be fitted on the pair of grips, in which the holder fits on the pair of grips, as the pair of grips are brought close to each other, having a space defined between an inside of the holder and respective upper end faces of the pair of grips, to hold the clamp ring in a first diameter state wherein:

the holder has two side walls and inwardly projecting stopper members provided on the side walls thereof;

the stopper members are each adapted to abut an upper end face of a corresponding grip;

one of the grips has a first width dimension;

the other grip has a second width dimension that is narrower than the first width dimension; and the other grip has a radially extending raised shoulder part at an upper tip raised toward the one grip.

11. A hose clamp comprising:

a clamp member as a main body comprised of
a claim ring and
a pair of grips as segments thereof crossing each other, and a holder as a separate body to be fitted on the pair of grips, in which the holder fits on the pair of grips, as the pair of grips are brought close to each other, having a space defined between an inside of the holder and respective upper end faces of the pair of grips, to hold the clamp ring in a diameter-enlarged state wherein:

the holder has two side walls with inwardly projecting stopper portions provided on the side walls;

the stopper portions are each adapted to abut on an upper end face of a corresponding grip; and one of the grips has an upper tip with a radially extending raised shoulder part raised toward the other grip.

12. The hose clamp of claim 11, wherein the one grip raised shoulder part projects away from a plane containing a substantial portion of the one grip.

* * * * *